May 19, 1925.

O. DANIELS

AUTOMATIC FISHING REEL

Filed Feb. 5, 1924 2 Sheets-Sheet 1

1,537,936

Oscar Daniels Inventor

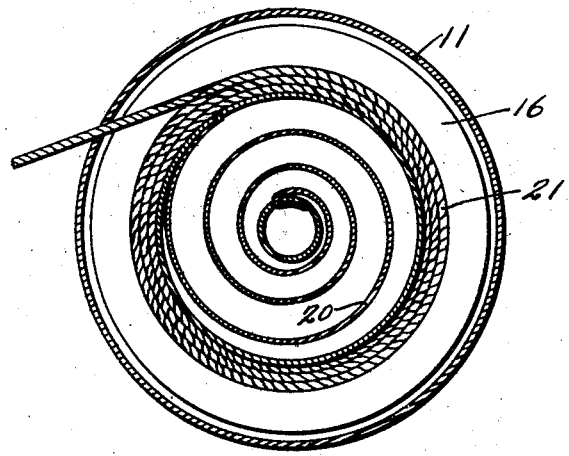
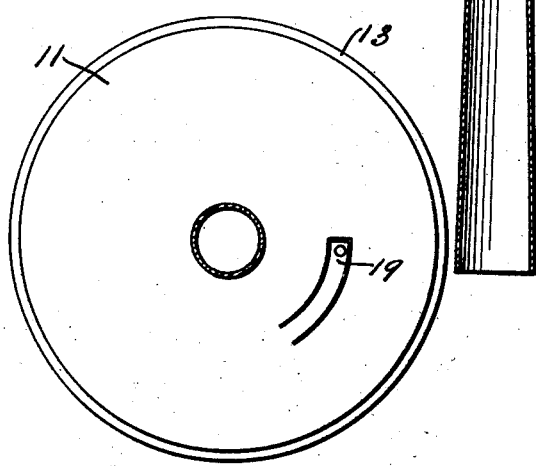
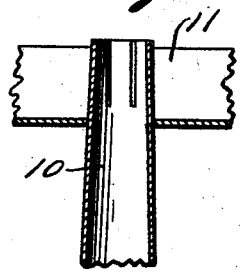

Patented May 19, 1925.

1,537,936

UNITED STATES PATENT OFFICE.

OSCAR DANIELS, OF BOWMANVILLE, ONTARIO, CANADA.

AUTOMATIC FISHING REEL.

Application filed February 5, 1924. Serial No. 690,763.

*To all whom it may concern:*

Be it known that I, OSCAR DANIELS, a subject of the King of England, residing at Bowmanville, in the Province of Ontario, Dominion of Canada, have invented a certain new and useful Improvement in Automatic Fishing Reels, of which the following is a specification, reference being had to the accompanying drawing.

My invention relates to improvements in fishing reels and more particularly to that type which are automatically operated.

An important object of the invention is to provide a fishing reel which will cause the fishing line to be wound about the reel when actuated by a fish.

A further object of the invention is the provision of a fishing reel which will automatically operate without the attention of the fisherman.

A still further object of the invention is the provision of a device of this character which is comparatively simple yet durable of construction and efficient for the purpose intended.

Other objects and advantages of this invention will be apparent during the course of the following description.

In the accompanying drawings forming a part of this specification, and in which like numerals are employed to designate like parts throughout the same, Fig. 1 is a top plan view of a fishing reel embodying my invention;

Fig. 5 is a horizontal section taken on the line 5—5 of Fig. 2;

Fig. 6 is a vertical section taken on the line 6—6 of Fig. 1;

Fig. 7 is a horizontal section taken on the line 7—7 of Fig. 2, and

Fig. 8 is a detailed view of the connecting tube.

Figure 1:
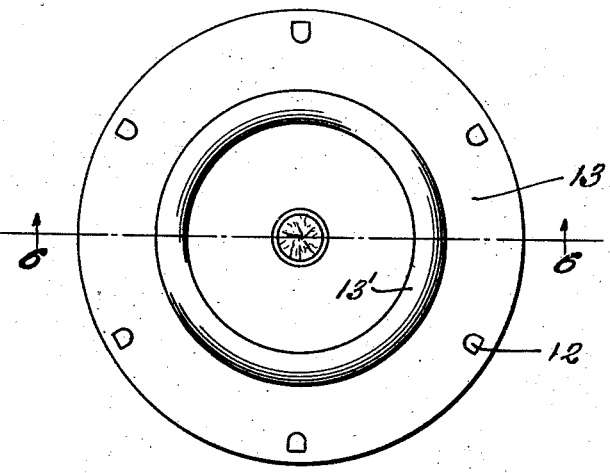
Figure 2:
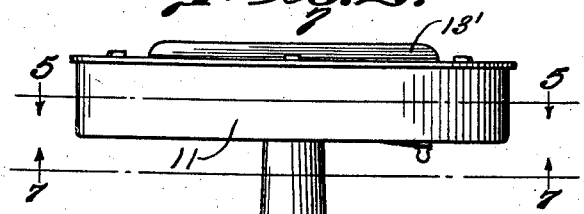
Fig. 2 is a side elevation of the same.
Figure 3:
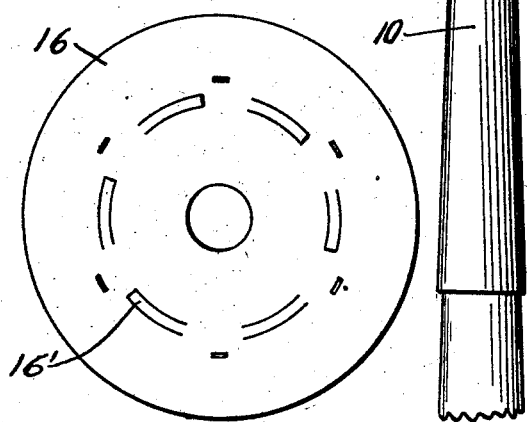
Fig. 3 is a bottom plan of one of the reel plates.
Figure 4:
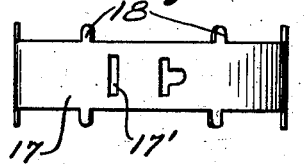
Fig. 4 is a side elevation of the reel band.

In the drawings, wherein for the purpose of illustration is shown the preferred embodiment of my invention, the numeral 10 designates a tapered tube which is adapted to fit the small end of a fishing rod and retain the device thereon. This tube is secured to and carries a preferably circular casing 11 having a plurality of clips 12 formed on its upper edge and adapted to penetrate suitable apertures formed in a cover plate 13, and bent over to prevent displacement thereof. The cover plate is provided with a circular groove 13' which provides space for the upper clips.

The numeral 14 generally denotes a rotatable reel composed of an upper reel plate 15, which is preferably circular and is provided with a plurality of apertures, a lower reel plate 16, similar to the upper reel plate 15, also having a plurality of apertures formed therein. The lower reel plate 16 is also provided with a plurality of projections 16' which are formed by cutting portions of the plate and bending the same slightly downward. The reel plates 15 and 16 are connected by means of a reel band 17 which is provided with clips 18 formed on its edges adapted to penetrate the apertures in the plates and bent over to securely retain the plates in position.

A section of the casing bottom is cut to form a spring catch 19 as illustrated in Fig. 7, the catch being positioned directly below the projections formed on the bottom reel plate and adapted to engage them.

The reel is rotated by means of a coiled band spring 20, the outer extremity being secured to the reel band 17 by means of a slot 17' formed in the band for this purpose. The inner extremity of the spring 20 is connected to the tube 10, the end being bent and secured by means of a pair of longitudinal slits formed in the upper extremity of the tube.

The fishing line 21 is wrapped upon the reel, about the band 17 between the plates 15 and 16 and issues through an opening 22 formed in the side of the casing.

In the use of the device, the required length of fishing line is drawn from the reel and cast into the water, the rod being inserted into the ground or otherwise secured. It is obvious that the spring 20 will be wound by rotation of the reel while drawing the fishing line therefrom, thus creating a tendency to rotate the reel in the opposite direction or wind the line about the reel.

In order to prevent this action of the spring 20 the spring catch 19 is forced upwardly into engagement with the projections 16' formed on the bottom reel plate 16, the tension caused by the spring retaining the catch against the projections. When the line is given an outward pull, such as caused by a fish, the catch 19 will be disengaged from the projections 16' and resume its natural position below the same, thereby causing the line to be suddenly wound upon the reel. The sudden operation thus obtained is obviously more efficient than human hands can accomplish and it is thus possible that a single fisherman could operate numerous lines provided with this invention.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. An automatic fishing reel of the class described, comprising in combination with a fishing rod, of a tapered tube adapted to be fitted upon the said rod, a rotatable reel mounted on said tube and adapted to have a fishing line wound thereon, a spring positioned within the reel and adapted to rotate the same, a casing enclosing the reel, and means for controlling movement of the reel.

2. An automatic fishing reel of the class described, comprising in combination with a fishing rod, of a tapered tube adapted to fit upon the end of the rod, a reel rotatably mounted on said tube and adapted to have a fishing line wound about its periphery, a coil spring positioned within the reel for rotating the same, a casing for enclosing the reel, a cover plate adapted to cover the casing, and means for retaining the reel against rotation.

3. An automatic fishing reel, comprising in combination with a fishing rod, of a tapered tube adapted to be secured upon the extremity of the rod, a reel composed of a pair of plates, one of said plates having a series of projections struck therefrom, a band placed between the plates and secured thereto, the said reel being adapted to rotate about the said tube and to have a fishing line wound thereon, a coil spring positioned within the reel and adapted to rotate the same, a casing enclosing the said reel and line, a cover plate positioned on the casing, and a catch formed on the casing adapted to engage the said projections formed on the said reel plate.

4. In a fishing reel, the combination with a fishing rod, of a tapered tube adapted to be secured upon one end of said rod, a reel rotatably mounted on said tube adapted to have a fishing line wound on said reel, a coil spring positioned within said reel having connection with said tube and reel and adapted to be wound upon unwinding of said fishing line, a plurality of spring prongs struck from one side of said reel, a casing enclosing said reel, and a spring catch struck from said casing, movable into engagement with said prongs to secure said reel against rotation.

In testimony whereof, I hereunto affix my signature.

OSCAR DANIELS.